United States Patent [19]

Brown

[11] 4,036,713
[45] July 19, 1977

[54] PROCESS FOR THE PRODUCTION OF HIGH PURITY LITHIUM HYDROXIDE

[75] Inventor: Patrick M. Brown, Exton, Pa.

[73] Assignee: Foote Mineral Company, Exton, Pa.

[21] Appl. No.: 663,851

[22] Filed: Mar. 4, 1976

[51] Int. Cl.$^2$ ............................ C25B 1/20; C25B 1/26
[52] U.S. Cl. ........................................ 204/98; 204/128
[58] Field of Search ................................... 204/98, 128

[56] References Cited

U.S. PATENT DOCUMENTS 3,438,879   4/1976   Kircher et al. ................... 204/98

FOREIGN PATENT DOCUMENTS 506,130   9/1954   Canada ................................ 204/98

Primary Examiner—R. L. Andrews
Attorney, Agent, or Firm—Howson and Howson

[57] ABSTRACT

A process is described in which a brine from natural or other sources, containing lithium and other alkali and alkaline earth metals primarily as the halides, is preliminarily concentrated to a lithium content of about 2 to 7% to separate most of the alkali and alkaline earth metals other than lithium by precipitation, the pH of such a concentrated brine is then increased to about 10.5 to about 11.5, preferaly utilizing a product of the process, lithium hydroxide to precipitate substantially all of any remaining magnesium contaminants, and adding lithium carbonate to remove the calcium contaminants to provide a purified brine which is electrolyzed as the anolyte in a cell having a cation selective permeable membrane separating the anolyte from the catholyte, the latter being of water or aqueous lithium hydroxide, whereby the lithium ions migrate through the membrane to form substantially pure aqueous lithium hydroxide in the catholyte, a product from which highly pure lithium crystalline compounds such as lithium hydroxide monohydrate or lithium carbonate may be separated.

5 Claims, No Drawings

PROCESS FOR THE PRODUCTION OF HIGH PURITY LITHIUM HYDROXIDE

BACKGROUND OF THE INVENTION

Lithium metal and its various compounds are finding increasing commerical applications in the production of: lubricating greases; glass and ceramics; aluminum; in swimming pool sanitizers; air conditioning and refrigeration systems; primary and secondary batteries; nuclear energy production; and even in drugs for the control of manic-depressive psychosis. Most of these uses require lithium compounds of high quality.

Natural brines have long been recognized as a potential source of lithium values and much work has been done with varying degrees of success in attempts to commercialize such resources. Such brines, however, generally contain only very small amounts of lithium. For example, the brines of the Great Salt Lake in Utah contain only about 34 to 66 ppm. Other natural brines such as those drived from ground water in mines or other sources may contain up to about 0.5% lithium but such concentrated brines are rare. Also, many of these brines are associated with high concentrations of magnesium which makes lithium recovery uneconomical. Therefore, the recovery of lithium from natural brines presents a very difficult task, not only because of the economics of working with the very low concentrations of lithium which occur in nature, but also due to the difficulty of separating lithium compounds in a useful degree of purity from the closely chemically related materials with which lithium salts are normally contaminated. Nevertheless, the demand for lithium is such that various attempts have been made in the prior art to recover the lithium values of natural brines.

THE PRIOR ART

*The Kirk-Othmer Encyclopedia of Chemical Technology*, Second Edition, Supplement Volume, pages 438–467, discusses the brines of the Great Salt Lake of Utah and the attempts to date to recover various chemical values from them. It is particularly interesting to note that brines from this source vary widely in composition, not only from place to place in the lake, but also from year to year. This reference describes a number of different methods which have been proposed for the recovery of lithium values from these brines, including: evaporation-crystallization-thermal decomposition; ion exchange; lithium aluminum complexing; and solvent extraction. It appears that all of these previously proposed methods are complex and expensive and fail to provide products of sufficiently high purity for use in most commercial applications.

Rosett et al. U.S. Pat. No. 2,004,018 describes a method of the prior art for separating lithium salts from mixtures with the salts of other alkali and alkaline earth metals, in which the mixed salts are initially converted to the sulfates and then treated with aluminum sulfate to remove the bulk of the potassium as a precipitate. Controlled amounts of soluble carbonate are then added to the solution to first remove the magnesium and calcium carbonates, and then to precipitate and separate lithium carbonate from the other alkali metal carbonates which remain in solution.

Rosett et al. prefer, however, to work with the chlorides which they obtain by treating the mixed salts with hydrochloric acid. The resulting solution is concentrated by boiling until the boiling point is such that, on cooling, the largest possible amount of mixed alkai metal chlorides precipitates leaving the lithium chloride in solution. The solution may then be further concentrated to such a point that, on cooling, the lithium chloride precipitates out in the form of the monohydrate.

Cunningham U.S. Pat. No. 2,726,138 relates to a process for preparing so-called high-purity lithium chloride by first concentrating a crude aqueous solution containing about 2% total of lithium, sodium and potassium chlorides, to a concentration of about 40–44% lithium chloride by evaporation at elevated temperatures so that on cooling to 25°–50° C., the sodium and potassium chlorides precipitate out leaving the more soluble lithium chloride in solution. The resulting solution is then extracted with an inert organic solvent for the lithium chloride.

Burkert et al. U.S. Pat. No. 3,523,751 relates to the precipitation of lithium carbonate from lithium chloride solution by the addition of sodium carbonate. It is further incidentally disclosed that lithium hydroxide solutions are readily carbonated to precipitate lithium carbonate. It is also noted that the reaction of lithium chloride solution with sodium carbonate results in the precipitation of lithium carbonate.

Honeycutt et al. U.S. Pat. No. 3,597,340 relates to the recovery of lithium hydroxide monohydrate from aqueous chloride brines containing both lithium chloride and sodium chloride, by electrolyzing the brines in a diaphragm cell which maintains separation between the anolyte and catholyte; the diaphragm being of the conventional asbestos fiber mat type.

Stewart et al. U.S. Pat. No. 3,652,202 describes a method for preparing alkali metal carbonate from carbonated aqueous alkali metal hydroxide cell liquor prepared by electrolysis of alkali metal chloride in an electrolytic cell by contacting the carbonated cell liquor with atapulgite type clay, and, thereafter, crystallizing alkali metal carbonate from the so-treated cell liquor.

Macy U.S. Pat. No. 3,268,289 describes the concentration of Great Salt Lake brines by solar evaporation and means for increasing the ratio of lithium chloride to magnesium chloride in the concentrated brine. It is said that the resulting brine may then be processed in various ways such as in an electrolytic cell to remove the magnesium, or by oxidizing the magnesium to magnesium oxide.

Langer et al. U.S. Pat. No. 3,755,533 describes a method for separating lithium salts from other metal salts by complexing with monomeric or polymeric organic chelating agents.

From the foregoing it will be apparent that while many and varied proposals have been made for winning lithium from natural brines or mixtures of alkali and alkaline earth metal salts, all previous methods have involved difficult or expensive separations, and have not, in general, provided lithium products of sufficient purity for use in most industrial applications.

It is, therefore, an object of the present invention to provide a relatively simple and economic process for the recovery of lithium values in the form of a lithium compound of high purity which is also readily convertible into other highly pure lithium compounds.

It is another object of this invention to provide an improved electrolytic process for the concentration of lithium values which is highly efficient and which may be operated for extended periods of time due to the absence of interfering cations.

It is a specific object of the invention to produce a highly pure aqueous solution of lithium hydroxide from which such valuable products as crystalline lithium hydroxide monohydrate and lithium carbonate may be readily separated.

These and other objects of the invention, which will become apparent hereinafter are achieved by the following process.

BRIEF DESCRIPTION OF THE INVENTION

In a preliminary operation, a brine containing lithium in aqueous solution with other alkali and alkaline earth metals, primarily as the halides, is first concentrated by any suitable means to a lithium concentration of about 2 to about 7%, by weight, thus causing the major portion of all sodium and potassium present to precipitate out of the brines as the halides which are insoluble in a lithium halide solution of that concentration, i.e., about 12 to about 44%, calculated as lithium chloride.

After this separation of the sodium and potassium values, the pH of the brine is adjusted to a value in the range from about 10.5 to about 11.5, preferably about 11 and lithium carbonate is added to cause any remaining calcium and/or magnesium and any iron present to precipitate. This pH adjustment may be made by any suitable means, but it is preferred to accomplish it by the addition of lithium hydroxide and lithium carbonate, both of which are easily obtainable from the product of the process as will be seen below. The addition of lithium hydroxide and lithium carbonate in amounts stoichiometrically equal to the content of iron, calcium and magnesium, results in substantially complete removal of these cations as the insoluble iron and magnesium hydroxides, and calcium carbonate.

The resulting brine, from which substantially all cations other than lithium have been removed in this way, is neutralized, suitable with hydrochloric acid, and then electrolyzed as the anolyte in a cell which a membrane selectively permeable to cations but not to anions separates the brine (anolyte) from the catholyte which may be water or, preferably, aqueous lithium hydroxide. As the electrolysis proceeds the lithium ions in the brine migrate to and through the selectively permeable membrane into the catholyte. Inasmuch as the hydroxyl ions in the catholyte cannot migrate through the membrane into the anolyte, both lithium and hydroxyl ions build up in the catholyte thus producing a substantially pure aqueous solution of lithium hydroxide. The electrolysis may be continued until substantially all of the lithium ions have been removed from the brine in the anolyte and a concentration of from about 1 to about 14% lithium hydroxide is obtained in the catholyte.

The product of this novel process, substantially pure aqueous lithium hydroxide, is readily converted to other high purity lithium products of commercial utility. For example, the solution may be treated with carbon dioxide to preferentially precipitate high purity lithium carbonate. Alternatively, the aqueous lithium hydroxide may be evaporated either partially or completely to produce high purity lithium hydroxide monohydrate. A preferred practice, is to partially evaporate the solution to crystallize high purity lithium hydroxide monohydrate and recycle the remaining solution to freshly prepared solution, with a bleed, since the crystalline lithium hydroxide monohydrate produced in this way is of even higher purity than could otherwise be produced. The lithium products produced in this way are of very high purity and, indeed, will contain a maximum residual chloride of 0.05%, with a content of 0.01% chloride being more typical. This is very important in many applications such as where the lithium hydroxide is to be used in greases which must contain a minimum of chloride ion due to its corrosion potential. Also, if chloride is not excluded, as in a cell utilizing a typical asbestos membrane, it is extremely difficult to produce a high purity lithium hydroxide by recrystallization.

DETAILED DESCRIPTION OF THE INVENTION

It is necessary in the process of the present invention to reduce to a minimum the concentration of cations other than lithium in the brine to be electrolyzed. This is obviously essential to ensure production of high purity lithium hydroxide, but it is also necessary because certain cations such as calcium, magnesium, and iron have a tendency to precipitate in the selective cation permeable membrane as the insoluble calcium, magnesium, and iron hydroxides. Such precipitation is, of course, highly undesirable since it not only reduces the efficiency of the membrane in passing the lithium ions, but also greatly shortens the useful life of the membrane and thus the possible period of continuous operation of the cell.

The process of the present invention is widely applicable to all lithium-containing aqueous brines. Suitable brines occur in nature both as ground water in wells or mines and as surface water in the oceans and lakes, such as the Great Salt Lake of Utah. Brines can also be synthetically produced by the action of hydrochloric acid with lithium minerals to produce lithium chloride-containing brines. The hydrochloric acid for this purpose may be obtained by reacting the hydrogen and chlorine by-products of the electrolysis step of the present invention. Typically, such brines contain very low concentrations of lithium of the order of 50–500 ppm, or even less, although brines containing up to as much as 0.5% lithium may be found. While in theory, the process of the invention may be carried out on a brine of any concentration from very low up to saturation, it is obviously less feasible economically to operate on brines having a very low lithium content because of the time and size of the equipment which would be necessary. For this reason it is desirable, as a preliminary step, to concentrate naturally occurring dilute brines until the lithium concentration is raised to at least about 0.04% up to about 1%, and, preferably, at least about 0.1%.

Dilute brines may be concentrated in lithium content by any suitable method, although at present some sort of evaporative process is indicated because of the difficulty of chemically separating the constituents of the mixture of salts normally found in the brines. While evaporation may be carried out in any known manner, it is preferred to simply store the brines in ponds and permit concentration by solar evaporation over a period of time. Such solar evaporation tends to separate a part of the sodium and potassium chlorides which are less soluble than lithium chloride. Moreover, due to absorption of carbon dioxide from the air, a portion of the magnesium content may also be removed from basic brines in this way as magensium carbonate.

When the brines have thus been brought to a lithium concentration of about 0.04 to 1% or preferably at least about 0.1%, the pH of the brine is desirably, but optionally, adjusted to a value in the range from about 10.5 to about 11.5, preferably about 11 to aid in the removal of the cationic impurities, i.e., the cations other than lithium, particularly magnesium, if that element is present in substantial amounts. This may be accomplished by the addition of any suitable alkaline material such as lime, sodium carbonate or calcium hydroxide, the primary consideration being low cost. The brine may then be concentrated further by solar evaporation, typically to contain about 0.5 to 1% lithium (i.e., about 3.1 to 6.2% lithium chloride). Inasmuch as carbon dioxide absorption from the air may have reduced the pH to about 9, it may again be adjusted to 10.5 to 11.5 by the addition of lime, calcium hydroxide or sodium carbonate to reduce the residual magnesium and calcium in solution to about 0.1%.

The brine is then concentrated still further by any suitable means such as solar evaporation or, preferably and more rapidly, by submerged combustion according to techniques known per se in the art. The brines may again absorb carbon dioxide from the atmosphere during this process thus possibly again reducing the pH to about 9. In this way the brine is reduced in volume to a concentration of about 2 to about 7% lithium, i.e., about 12 to about 44% lithium chloride. The lithium chloride concentration is conveniently calculated by multiplying the lithium concentration by a factor of 6.1. Inasmuch as sodium and potassium chloride are substantially less soluble in the brine than lithium chloride, substantially all of the sodium and potassium are removed when the lithium concentration exceeds about 40%. Lithium chloride itself reaches saturation in aqueous solution at a lithium content of about 7.1% or about 44% lithium chloride at ambient temperatures. This, therefore, is the upper limit to which concentration of the brines is practical without precipitating lithium chloride with attendant contaminants. As noted above, inasmuch as substantial amounts of sodium and potassium remain in solution until the lithium concentration reaches about 35%, that is the practical lower limit of the evaporative concentration step of the process, unless sodium and potassium cations are to be removed via recrystallization of the hydroxides in order to obtain high purity lithium.

Inasmuch as the thus concentrated and purified brine is to be further purified by electrolysis it is necessary to remove any remaining interfering cations. It is also desirable to dilute the brine back to a lithium content of about 2 to 5% (about 12 to 30% lithium chloride) to limit chloride ion migration during electrolysis and electrical efficiencies are not significantly curtailed at such concentrations. This dilution will not be necessary, of course, if the evaporative concentration was not carried beyond the 5% lithium concentration. The removal of substantially all of the remaining interfering cations, which are normally primarily calcium and magnesium, and possibly iron, is accomplished by again raising the pH of the brine to about 10.5 to 11.5, preferably about 11. This may be done by the addition of any suitable alkaline material, but in order to obtain the best separation without contamination, it is preferred to add stoichiometric quantities of lithium hydroxide and lithium carbonate. In this way, substantially all of the interfering cations are removed as magnesium hydroxide, calcium carbonate or as iron hydroxides. The lithium hydroxide and lithium carbonate for this purpose are readily available from the product of the process as will be seen below.

The brine to be electrolyzed must be substantially free of interfering cations although, as a practical matter, small amounts of alkali metal ions such as sodium and potassium may be tolerated so long as the amount does not exceed about 5% by weight which can be removed by recrystallization. Cations which would seriously interfere with the electrolysis by precipitating in the cation permeable membrane such as iron, calcium and magnesium, must, however, be reduced to very low levels. The total content of such ions should, preferably not exceed about 0.004% although concentrations up to their solubility limits in the catholyte may be tolerated. Such higher concentrations could be used, if necessary, at the sacrifice of the operating life of the cell membrane. The content of anions other than the chloride ion in the brine to be electrolyzed should not exceed about 5%.

The concentration of lithium chloride in the brine to be electrolyzed may vary widely from very low concentrations such as 12% up to about 44%, by weight, which approaches the saturation level at ambient temperatures. It is obviously economically undesirable to work with very dilute brines due to the volume which must be electrolyzed to obtain a given amount of product which, of course, increases the processing time and size of equipment needed. As a practical matter, therefore, the brine should contain at least about 2% lithium or about 12% lithium chloride. On the other end of the scale, while it is possible to electrolyze a brine approaching saturation in lithium chloride, i.e, about 44% (7.1% lithium), it is preferred not to use such concentrated brines because the tendency for chloride migration across the diaphragm increases. Therefore, it is most practical to employ as the anolyte a brine containing about 2 to 5% lithium or about 12% to about 30% lithium chloride for best results and efficiency.

The catholyte may be composed of any suitable material containing sufficient ions to carry the current. While water alone may be employed subject to the foregoing limitation, it is preferred to supply the necessary ionization by the product to be produced, i.e., lithium hydroxide. The initial concentration of lithium hydroxide may vary from only sufficient to permit the cell to operate up to the saturation concentration under the prevailing pressure and temperature conditions. However, inasmuch as it is undesirable as a rule to permit lithium hydroxide to precipitate in the cell, saturation is to be avoided. Moreover, inasmuch as no available cation selective membrane is perfect and passes some anions, the higher concentration of hydroxyl ions in the catholyte the greater the migration of such ions through the membrane into the anolyte which is undesirable since such ions react with chloride ions to produce chlorine oxides thus decreasing the efficiency of production of chlorine as a by-product and reducing the current efficiency of the cell as a whole.

Any available semi-permeable membrane which selectively passes cations and inhibits the passage of anions may be employed in the process. Such membranes are well known in the electrolysis art and need not be described in detail here. Suitable commercial membranes include those available from E.I. DuPont de Nemours & Co. under the Trademarks Nafion 475 and 325. Such a selectively cation permeable membrane is placed between the anolyte brine to be electrolyzed and the catholyte described above to maintain physical separation between the two liquids. A current of about 100 amps/ft$^2$ to about 300 amps/ft$^2$ is passed through the membrane into the catholyte. The chloride ions in the anolyte, of course, migrate to the anode and are discharged to produce chlorine gas which may be recovered as a by-product. The hydroxyl ions in the catholyte, while attracted toward the anode, are largely prevented from passing into the anolyte due to the impermeability of the membrane to such anions. The lithium ions which enter the catholyte, of course, associate themselves with hydroxyl ions derived from the water in the catholyte, thus liberating hydrogen ions which are discharged at the cathode with the formation of hydrogen which may also be collected as a by-product.

In this way the lithium chloride in the anolyte brine is converted to lithium hydroxide in the catholyte; the efficiency of conversion being virtually 100% based upon the lithium chloride charged to the anode compartment of the cell. The electrolysis may be operated continuously until the concentration of lithium hydroxide reaches the desired level which may range up to 14% or just below saturation. This aqueous lithium hydroxide is of very high purity and will contain no more than about 0.5% cations other than lithium, nor more than about 0.05% anions other than hydroxyl. It is especially to be noted that the chloride content will not exceed about 0.04%.

The high purity aqueous lithium hydroxide provided by the process of the invention may be sold as such or it may be easily converted to other commerically desirable high purity lithium products. For example, the aqueous lithium hydroxide may be treated with carbon dioxide to precipitate high purity lithium carbonate containing no more than 0.05% chloride and typically only about 0.01%.

Alternatively, the aqueous lithium hydroxide may be converted to high purity crystalline lithium hydroxide monohydrate by simply evaporating the solution to dryness. More sophisticated crystallization techniques may be used employing partial crystallization, recycling and bleeding, to obtain crystalline lithium hydroxide monohydrate of the very highest purity.

It will be seen from the foregoing that part of the aqueous lithium hydroxide product may thus be converted to provide the lithium carbonate and lithium hydroxide employed in an earlier stage of the process to remove the iron, calcium and magnesium content of the concentrated brines.

It should also be apparent from the foregoing that the new process for the first time provides a method for winning lithium values from natural brines in high purity in the form of products directly useful in commercial applications without further purification and that the recovery of lithium from the concentrated brines is substantially 100%.

The invention will now be described in further detail in the following working example.

EXAMPLE 1

A brine pumped from a well, having an initial lithium concentration of 0.04%, and the further composition shown in column A of Table I, was concentrated by solar evaporation to a lithium content of about 0.6% and the overall composition set forth in Column B of Table I. This brine was treated with lime, the brine separated, and further evaporated by submerged combustion to provide a brine containing about 6.2% lithium and the overall composition set forth in column B of Table I. It will be seen that although this resulted in increasing the lithium concentration about 155 times, the concentration of sodium was reduced from 6.2 to 0.06% and the concentration of potassium increased from 0.8% to only 0.9%. It is clear, therefore, that the bulk of the sodium and potassium was thus removed by precipitation, leaving a brine containing about 37.8% lithium chloride with small amounts of sodium, potassium, magnesium, calcium and sulfate ions as contaminants.

This brine (B) was diluted and purified by the addition of stoichiometric amounts of lithium hydroxide and lithium carbonate to raise the pH to 11 with reduction of the magnesium content to only 0.00015% and the calcium content to only 0.0032%; the final lithium content being 4.48% or about 27.3% lithium chloride (anolyte C).

Anolyte C was charged to a conventional electrolytic cell containing a selectively cation-permeable membrane substantially impermeable to anions (Nafion 325) separating the anolyte from the catholyte. The catholyte was 2% aqueous lithium hydroxide. A current of 42.5 amps was applied at 3.2 volts and after 6 hours the concentration of aqueous lithium hydroxide in the catholyte was 8%. The overall composition of the aqueous lithium hydroxide product is given in column D of Table I.

A portion of the catholyte product was treated by bubbling carbon dioxide through it to precipitate high purity lithium carbonate of the composition shown in column E of Table I. It will be seen that the chloride content of this product was only 0.0065%.

Another portion of the product aqueous lithium hydroxide was partially evaporated to precipitate high purity lithium hydroxide monohydrate of the composition set forth in column F of Table I. It will be seen that this product contains only 0.0054% chloride and is, therefore, suitable for use in preparing lithium greases without further purification.

Table I

| | Concentrations in Percent by Weight | | | | | |
|---|---|---|---|---|---|---|
| | A Brine | B Concentrated Brine | C Anolyte | D Catholyte | E $Li_2CO_3$ | F $LiOH \cdot H_2O$ |
| Na | 6.2 | 0.06 | 0.038 | 0.021 | 0.012 | 0.044 |
| K | 0.8 | 0.90 | 0.51 | 0.32 | 0.16 | 0.054 |
| Mg | 0.04 | 0.19 | 0.00015 | 0.0018 | 0.0006 | 0.0003 |
| Li | 0.04 | 6.2 | 4.48 | 2.31 | 18.51 | 16.03 |
| Ca | 0.05 | 0.012 | 0.0032 | 0.0012 | 0.010 | 0.0003 |
| SO4 | 0.71 | 0.024 | 0.018 | 0.006 | 0.007 | 0.009 |
| Cl | 10.06 | 32.9 | 23.59 | 0.038 | 0.0065 | 0.0054 |

The electrolytic process may be continued until 100% of the lithium chloride in the anolyte is converted to aqueous lithium hydroxide in the catholyte or may be operated on a continuous basis by continuous addition of brine C to the anode compartment and withdrawal of lithium hydroxide from the catholyte with the addition of make-up water.

It should be apparent that with the unique combination of steps of the present process it is possible to minimize the sodium, potassium, magnesium, calcium and chloride impurities in the product aqueous lithium hydroxide and also, therefore, in the lithium carbonate, lithium hydroxide monohydrate or other lithium products derived therefrom. More specifically, but for the concentration of the brine to at least 35% lithium, thus precipitating the halides of alkalis other than lithium, the product would contain larger amounts of sodium and potassium impurities. If not for removal of all but traces of the calcium and magnesium by adjusting the pH, preferably with lithium carbonate and lithium hydroxide, the life of the cation permeable membrane would be very limited and the product would contain larger amounts of calcium and magnesium impurities. Moreover, if an ordinary diaphragm of asbestos fibers or other than a cation selective membrane were used, the chloride content of the products would be much higher, thus reducing their commercial value and utility. Still further, if the precipitation of the desired product were made from one of the earlier brines or from a catholyte electrolyzed with an ordinary membrane, products of substantially lower purity would result. Therefore, the combination of steps of the present process produces a unique result and products of far greater purity than could have been obtained in the processes of the prior art.

The hydrogen and chlorine produced as by-products of the electrolysis may be reacted to produce halogen chloride which produces hydrochloric acid on dissolution in water. This acid can be reacted with the high-purity lithium hydroxide monohydrate obtainable from the process as above to produce extremely high purity lithium chloride which, in turn, may be converted to extremely high purity lithium metal.

What is claimed is:

1. An economical process for the production of high purity lithium hydroxide from a brine containing lithium and other alkali and alkaline earth metal halides, which comprises;

concentrating said brine to a lithium content of about 2 to about 7% to precipitate almost all of the alkali and alkaline earth metals other than lithium, adjusting the pH of the concentrated brine to about 10.5 to about 11.5, thus precipitating substantially all of any remaining calcium, magnesium and iron contaminants, neutralizing the thus purified brine with hydrochloric acid, and electrolyzing the thus purified and neutralized brine as the anolyte in the electrolytic cell in which a cation selective permeable membrane separates the anolyte from the catholyte, whereby the lithium ions in the anolyte migrate through the membrane to form high purity lithium hydroxide in the catholyte and hydrogen and chlorine are evolved at the electrodes as by-products.

2. The process of claim 1 wherein the pH adjustment is accomplished by the addition of lithium hydroxide monohydrates and lithium carbonate in amounts at least stoichiometric with respect to the calcium, magnesium and iron contaminants.

3. The process of claim 1 including the additional step of concentrating said catholyte to crystallize therefrom high purity lithium hydroxide monohydrate and recrystallization of said material to obtain a product containing no more than 0.5% of the cations other than lithium.

4. The process of claim 1 including the additional step of adding carbon dioxide to said catholyte to precipitate high purity lithium carbonate.

5. The process of claim 1 including the additional step of reacting said by-product hydrogen and chlorine to produce hydrochloric acid and reacting said acid with high purity lithium hydroxide monohydrate from the process of claim 3 to produce extremely high purity lithium chloride suitable for use in the production of extremely high purity lithium metal.

* * * * *